US007984585B1

(12) United States Patent
Wu

(10) Patent No.: US 7,984,585 B1
(45) Date of Patent: Jul. 26, 2011

(54) METHODS AND DEVICES FOR PLANT WEAVING

(76) Inventor: Chien-Cheng Wu, Berkeley, CA (US)

( * ) Notice: Subject to any disclaimer, the term of this patent is extended or adjusted under 35 U.S.C. 154(b) by 113 days.

(21) Appl. No.: 12/321,999

(22) Filed: Jan. 28, 2009

(51) Int. Cl.
*A01G 17/06* (2006.01)

(52) U.S. Cl. ......................................... 47/58.1 R; 47/45

(58) Field of Classification Search .................. 47/4, 44, 47/47, 45, 58.1 R, 66.7, 70; 139/420 R, 424
See application file for complete search history.

(56) References Cited

U.S. PATENT DOCUMENTS

| 344,885 | A | | 7/1886 | Viser | |
|---|---|---|---|---|---|
| 1,619,272 | A | | 3/1927 | Roy | |
| 3,105,327 | A | * | 10/1963 | Gasper | 47/47 |
| 3,357,129 | A | * | 12/1967 | Torrence | 47/79 |
| 3,494,071 | A | | 2/1970 | Simmon | |
| 3,992,812 | A | | 11/1976 | Horowitz | |
| 4,040,208 | A | * | 8/1977 | England | 47/67 |
| 4,993,184 | A | * | 2/1991 | Howe | 47/4 |
| 5,711,107 | A | * | 1/1998 | Louisiana | 47/45 |
| 5,787,641 | A | | 8/1998 | Watkins | |
| 5,964,057 | A | * | 10/1999 | Korte-Jungermann | 47/70 |
| 6,202,348 | B1 | | 3/2001 | Reiger | |
| 6,209,258 | B1 | | 4/2001 | Schneider | |
| 6,349,502 | B1 | | 2/2002 | Fernandez | |
| 6,453,606 | B1 | | 9/2002 | Shulman et al. | |
| 6,874,276 | B2 | | 4/2005 | Morrison | |
| 6,895,712 | B2 | | 5/2005 | Gunderman et al. | |
| 7,281,352 | B2 | | 10/2007 | Peck | |
| D555,535 | S | | 11/2007 | Mantor | |
| 7,328,532 | B2 | | 2/2008 | Golan | |
| 2004/0088915 | A1 | | 5/2004 | Power | |
| 2006/0156534 | A1 | | 7/2006 | Huang | |
| 2010/0101144 | A1 | * | 4/2010 | Kurtz | 47/66.7 |

FOREIGN PATENT DOCUMENTS

| CN | 1596610 | 3/2005 |
|---|---|---|
| SU | 1055417 A | 11/1983 |
| SU | 1600651 A | 11/1987 |

OTHER PUBLICATIONS

Cooper, "Living Sculpture," Copyright 2001, Octopus Publishing, London.
Jones, "Reinventing the Garden," Copyright 2003, Thames and Hudson, London.

* cited by examiner

*Primary Examiner* — Rob Swiatek
*Assistant Examiner* — Kristen C Hayes
(74) *Attorney, Agent, or Firm* — Sharon Adams; Adams Law Office

(57) ABSTRACT

Methods and devices for rapidly weaving three-dimensional plant shapes. The plant-weaving device comprises an outer receptacle that is capable of receiving a frame support that supports a variety of three-dimensional frames. Plants with long stems are prepared and inserted in the plant-weaving device, and are woven around and secured to the frame. After weaving, the plants may be stored or transported.

6 Claims, 7 Drawing Sheets

METHODS AND DEVICES FOR PLANT WEAVING

CROSS REFERENCE TO RELATED APPLICATION

Not applicable.

BACKGROUND OF THE INVENTION

1. Field of the Invention

The invention relates to devices and methods for weaving one or more plants into a variety of interlocking, three-dimensional shapes using a weaving-aid device. The weaving-aid device allows the operator to efficiently create consistent, symmetrical woven plants by hand that may be easily transported.

2. Description of the Related Art

Nature has designed plants to grow in certain ways. Humans, however, often train plants to grow in shapes that are not found in nature. This is generally done for aesthetic reasons, and different techniques, including plant weaving techniques, may be used to create different shapes.

Previous techniques for weaving plants are time-consuming, making it commercially unfeasible to weave plants. It is often difficult to weave plants in a consistent, symmetrical, even pattern. In addition, existing plant weaving techniques are awkward and cumbersome, especially if the plant stems are long because long plant stems often get tangled and may break during the weaving process. Other techniques involve weaving plants permanently planted in the ground, making it impossible to transport the final woven plants.

Therefore, there exists a need to rapidly weave long-stemmed plants in a manner that protects plants stems from breaking, and creates an easily-transportable final plant product with an even, symmetrical interlocking, woven pattern.

BRIEF SUMMARY OF THE INVENTION

This invention relates to devices and methods for weaving one or more plants into a variety of interlocking, three-dimensional shapes using a weaving-aid device. The weaving-aid device comprises an outer receptacle connected with telescopic supporting arms which are in turn connected with support cords. The outer receptacle receives a frame support that is capable of supporting a weaving frame. One or more plants with long stems are inserted in the receptacle. The stems rest on support cords between the supporting arms. The operator manipulates the supported stems to create a woven interlocking column, or other woven interlocking shape, using the frame as a guide. The weaving-aid device allows an operator to rapidly weave the plants into beautiful shapes, thus allowing economical production of woven plants.

After weaving, the frame and the woven plants are removed from the receptacle. The finished product may be immediately transported, or may be allowed to grow prior to transport. The frame may be left in place or removed after a period of time.

BRIEF DESCRIPTION OF THE SEVERAL VIEWS

DETAILED DESCRIPTION OF THE INVENTION

Figure 1:
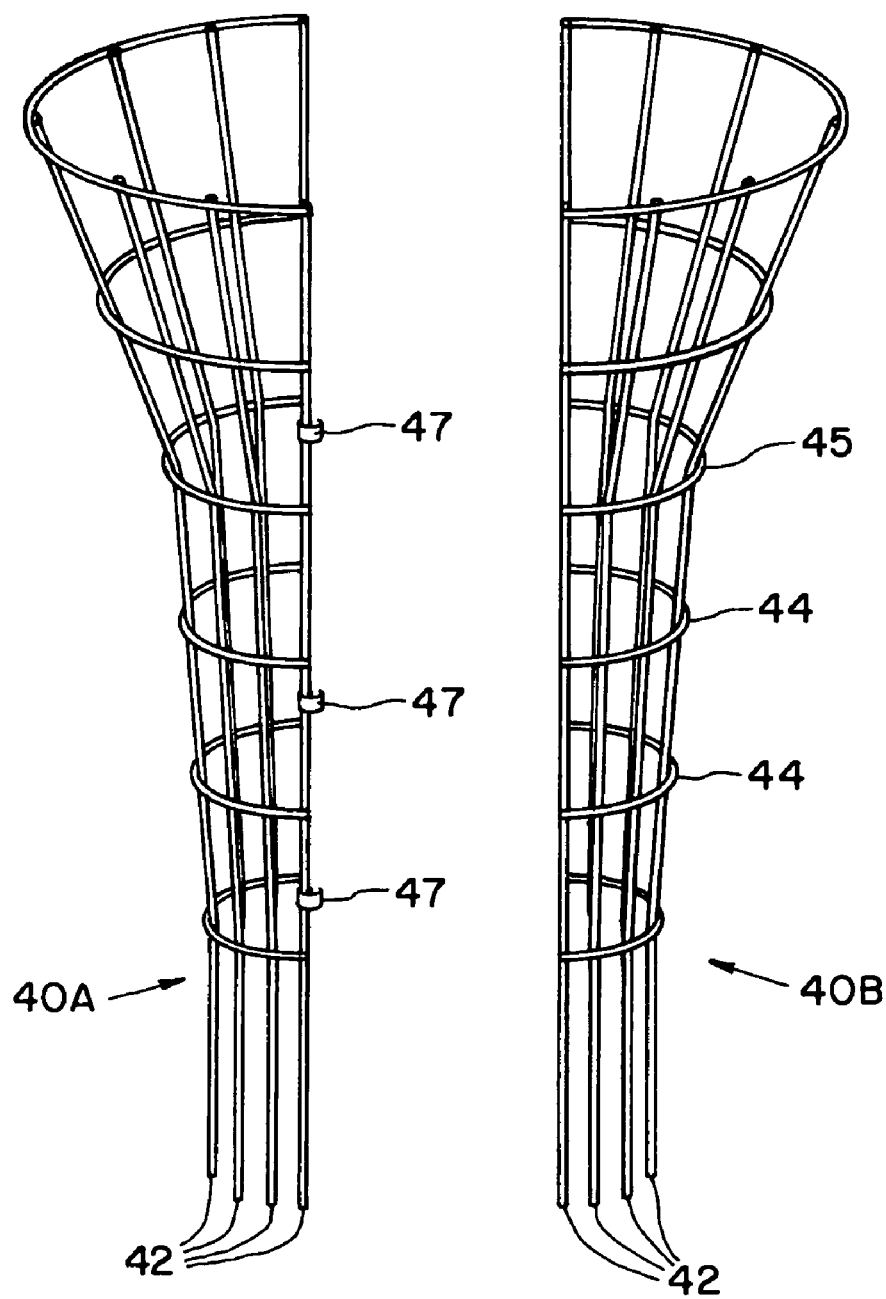
FIG. 1 shows a perspective view of a first embodiment of the frame.

Many different sizes and shapes of plants may be used with the weaving-aid device, resulting in different final woven plant shapes for the finished product. To create even, symmetrical woven shapes, it is desirable to select a plurality of plants that are similar in age, size of roots, number and length of stems.

In one embodiment, a plurality of plants 12 are selected. Plants 12 may be grown, or obtained from a nursery or garden store, and may be bare root, or not. It is often easier to work with bare roots, but plants with rootballs, roots encased in dirt, may also be used.

It may be desirable to prepare the plants prior to use to create consistent, similar plants and stems for weaving. If engaging in plant preparation, the operator may preferably obtain one-year stock. Plant 12 is cut to the desired height, and allowed to sprout new stems 14.

Whether using a plant directly, or after manipulation, plant 12 grows and gives rise to several stems 14. Plants 12 are allowed to grow for a period of time, until stems 14 reach the desired height and thickness, generally one to three years. For ease of manipulation during weaving it is preferable to use stems that are approximately ¼ to ½ inch in diameter, or about the thickness of a finger or an ordinary pencil.

Once the plant stems 14 reach the desired height and stem diameter, the operator selects one or more plants for weaving. The number of plants and number of stems may be varied.

The operator selects the desired number of plants 12 with generally similar rootstock height, stem thickness and stem height. If the plants have been growing in containers, they are removed from the containers, and the roots may be manipulated to release and ease any root binding that may have occurred. The plants are now ready for weaving, using weaving receptacle 20. It is often preferable to weave the plants in the winter, because the will have few or no leaves. However, plants may be woven at any time of the year.

The operator trims the stems, leaving the desired number. It is often preferable to leave two or three stems. However, the number of stems may be changed as needed to create the woven shape. For example, the inventor has created a woven plant using a single plant with eight stems. It is apparent that any number of plants and stems may be used, as desired.

The operator trims most or all of the branches and leaves from the bottom of the plants, and may leave some branches at the very top. The topmost branches may be left to create a beautiful, full crown at the top of the woven plant. However, it is not necessary to leave branches at the top.

Plants 12 are placed in outer receptacle 22, and positioned around frame. Frame is supported by a frame support. There are several embodiments of the frame support, and any means of supporting a frame structure may be used.

Figure 2:
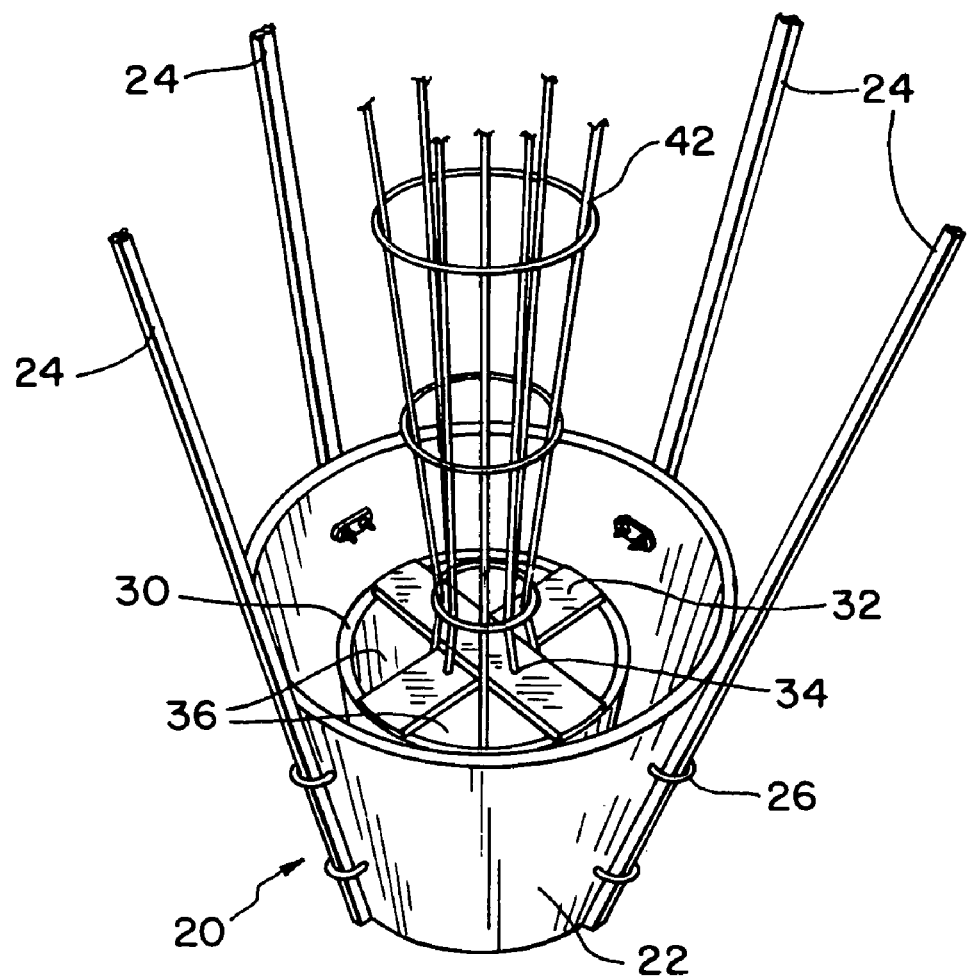
FIG. 2 is a partial, perspective view of a first embodiment of the weaving device.
Figure 3:
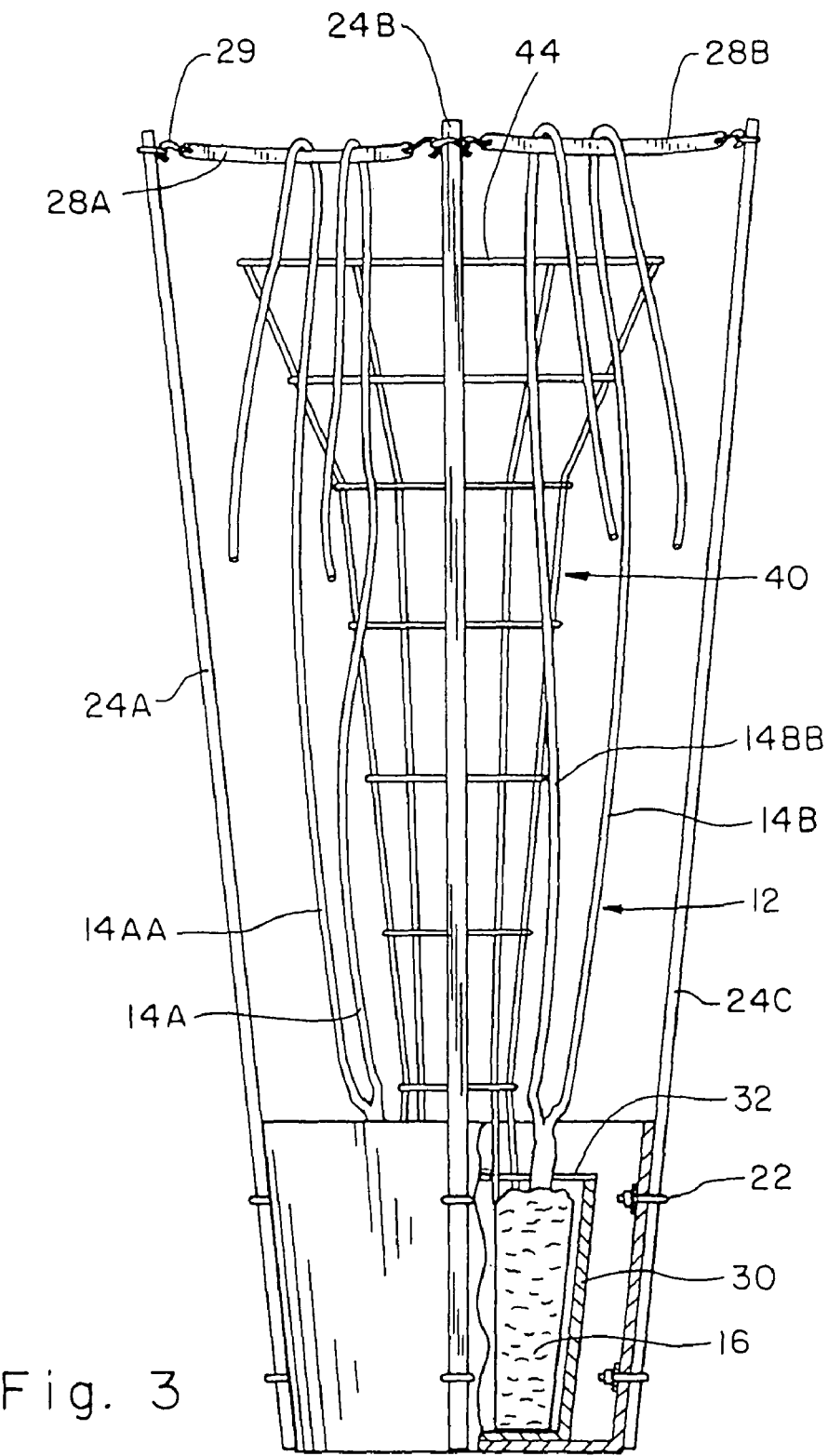
FIG. 3 is a plan view, with a partial cut-away cross-section, of the first embodiment of the weaving device.

In one embodiment, as shown in FIG. 2, the frame support may comprise a surface 32 with a plurality of holes 34 that are sized to receive frame legs 42. Surface 32 may be directly connected with outer receptacle 22 or may preferably be connected with inner receptacle 30. Surface 32 does not cover the entire receptacle, and has plant-receiving spaces 36. Surface 32 may contain four plant-receiving spaces 36, as shown in FIG. 2. It is readily apparently, however, that frame support 32 may have a single plant-receiving space 36, or any number of spaces 36, including but not limited to four plant receiving spaces 36. Frame legs 42 may be received in holes 34 on surface 32, or may be received in space 36. In this embodiment, each plant 12 is placed in a plant-receiving space 36, below surface 32, as shown in FIG. 3.

Figure 6:
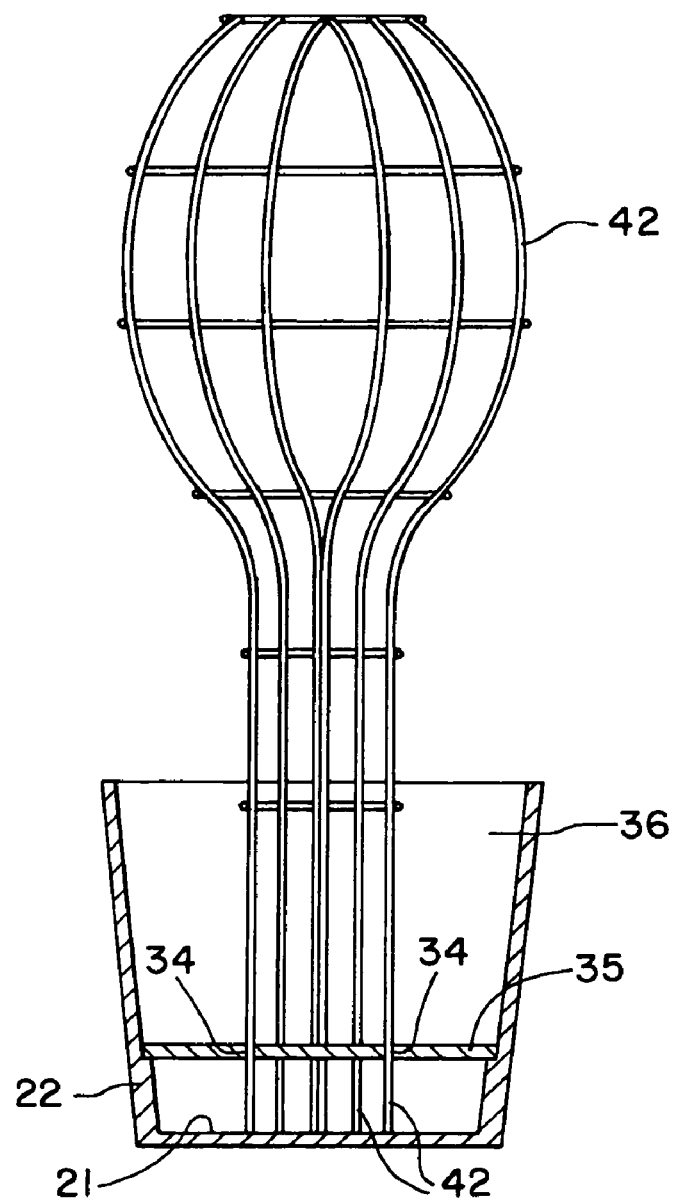
FIG. 6 is a cross-section, plan view of a third embodiment of the weaving device.

In another embodiment, as shown in FIG. 6, the frame support may comprise platform 35 that may be removeably connected with frame legs 42. Frame legs 42 may be removeably connected by simply resting on the top of platform 35. Alternatively, platform 35 may have a plurality of holes 34 that are sized to receive frame legs 42, wherein frame legs 42 pass through holes 34 and rest on bottom surface 21 of outer receptacle 22. Or, frame legs 42 may be removeably connected with platform 35 by brackets, clasps, or any other means known in the art. Platform 35 is connected with outer receptacle 22. Plants 12 rest on the top surface of platform 35 between outer receptacle 22 and frame legs 42, in plant-receiving space 36.

Figure 7:
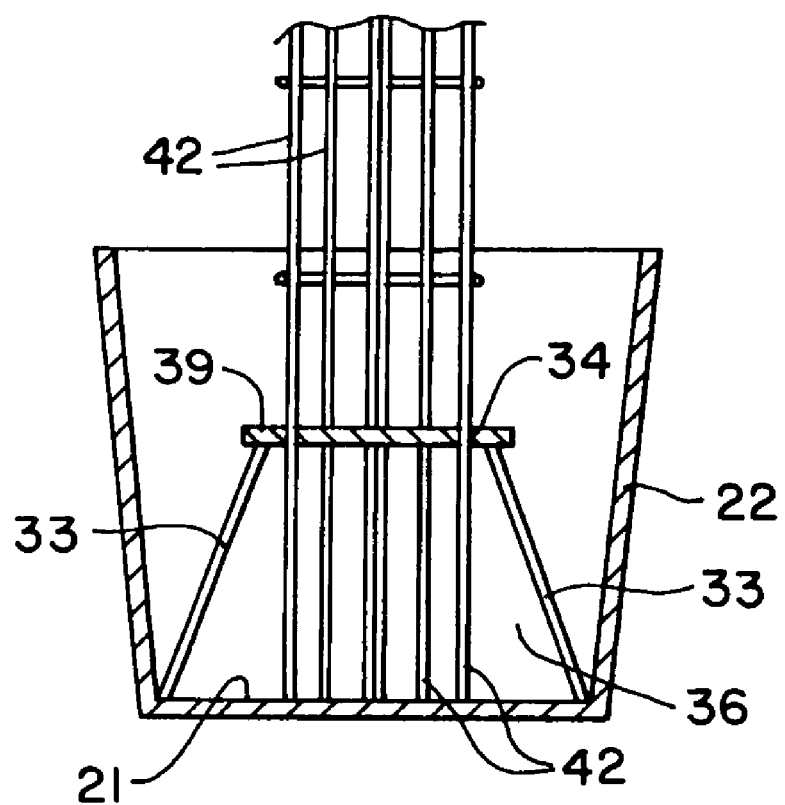
FIG. 7 is partial cross-section, plan view of a fourth embodiment of the weaving device.

In another embodiment, as shown in FIG. 7, the frame support comprises a plane 39, wherein plane 39 has a plurality of holes 34 sized to receive frame legs 42. Plane 39 may be any shape, and is preferably circular. Plane 39 is connected with a plurality of descending members 33 wherein each descending member 33 has a top, proximal end and a bottom, distal end. The proximal end of each descending member 33 is connected with, and supports, plane 39. The distal end of each descending member 33 rests on bottom surface 21 of outer receptacle 22. In the preferred embodiment, each descending member 33 descends at an angle, creating a funnel shape, as shown in FIG. 7, with the proximal end of each descending member defining a narrower perimeter that connects with and supports plane 39, and with the distal end of each descending member defining a wider perimeter that rest on bottom surface 21. However, it is apparent that descending members 33 can descend at any angle, including being vertical, that can hold and support plane 39. In this embodiment, plants 12 are inserted in plant-receiving space 36 between descending members 33, and rest inside and on the bottom 21 of outer receptacle 22.

After obtaining the plant-weaving device with the desired three-dimensional frame, the plants are selected. The plant roots may be trimmed so that they will fit into plant-receiving space 36. It is often easier to use bare roots because they easily fit into outer receptacle 22 and plant-receiving space 36.

Figure 4:
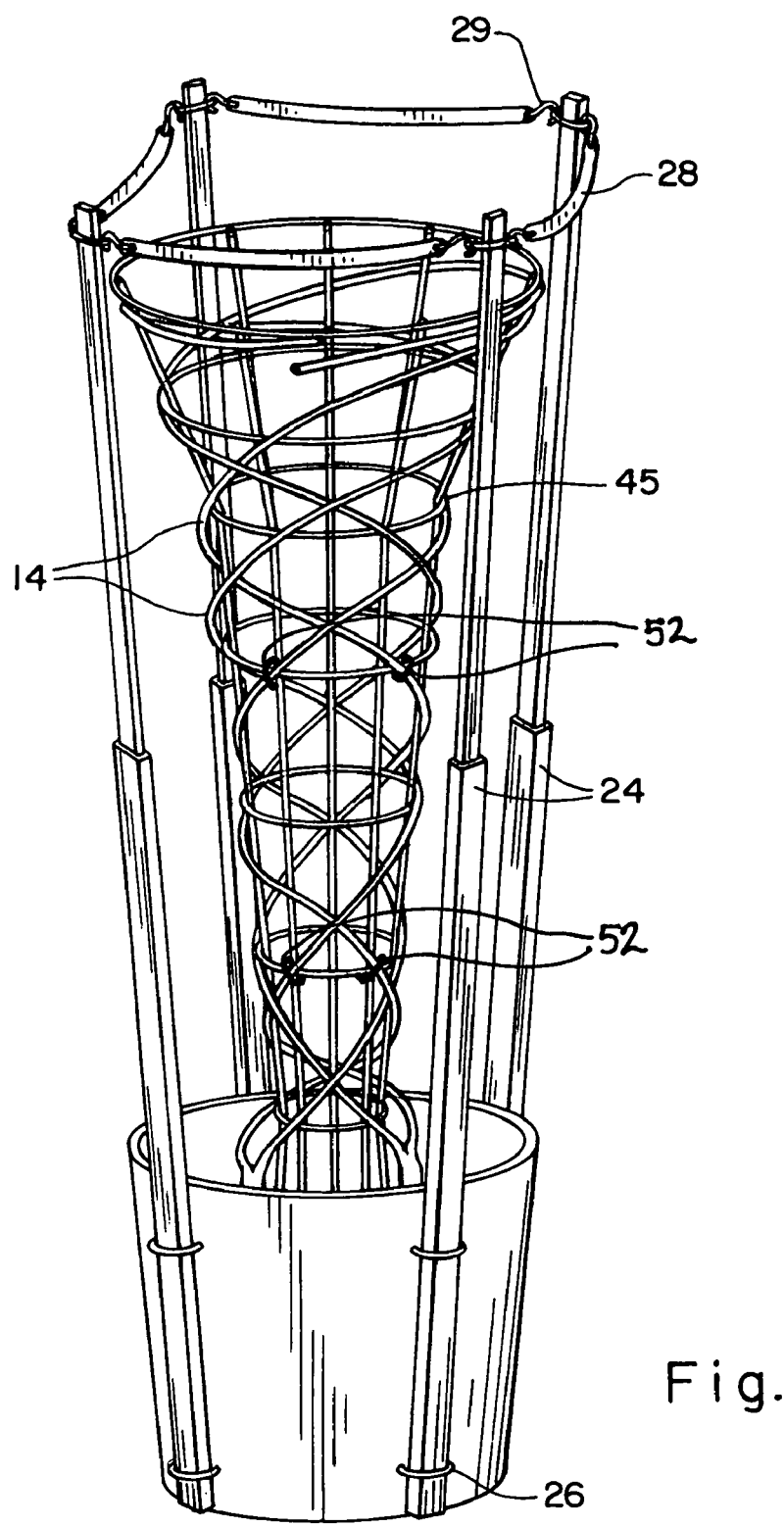
FIG. 4 is a perspective view of the a second embodiment of the weaving device.

Roots 16, either a root ball or bare roots, are inserted into outer receptacle 22. Outer weaving receptacle 22 is connected with a plurality of external support arms 24. See, e.g., FIG. 3. External support arms 24 provide support for stems 14 during weaving and act as a guide to the weaving process. External support arms 24 may be telescopic or extendable, as shown in FIG. 4, so that the height of support arms 24 may be adjusted, as needed, and are connected with support cords 28 to retain and support stems 14 during weaving, as shown in FIGS. 3 and 4. Support cords 28 connect at or near the top of support arms 24, that is support cords 28 connect with the upper portion of support arms 24.

External support arms 24 may be permanently or removeably connected with outer receptacle 22 by any means known in the art for permanently or removeably connecting items. In one embodiment, external support arms 24 are removeably connected with outer receptacle 22 by u-shaped hooks 26 that are permanently connected with outer receptacle 22. External support arms 24 are inserted through and retained by u-shaped hooks 26, as shown in FIG. 2.

Four external support arms 24 are shown, however the number of external support arms 24 and support cords may be varied, as needed. The number of external support arms 24 and support cords 28 will preferably be proportional to the number of stems 14 to be woven, for ease and convenience when weaving. That is, the number of support arms 24 and support cords 28 will be one-half the number of stems 14 to be woven. For example, when weaving eight stems 14, it is preferable to have four external support arms 24 and four support cords 28; when weaving ten stems 14, it is preferable to have five external support arms 24 and five support cords 28.

The example given below describes using four plants, and is for illustration purposes only. It is readily apparent that any number of plants may be selected and manipulated using the same steps described herein. Thus, four plants 12 with eight stems 14 are selected. Root ball 16 of one of the prepared plants is inserted into plant-receiving space 36, and the process is repeated until each of the remaining root balls is in plant-receiving space 36. Thus, in the illustrative example, a total of four plants are received and held by receptacle 22, and eight stems 14 rise up from roots 16 between internal frame 40 and four external support arms 24. Because stems 14 are relatively thin and flexible, it is desirable to support them by draping them over support cords 28, as shown in FIG. 3.

Support cords 28 are removeably connected with external support arms 24 by any means known. In one embodiment, as shown in FIG. 3, support cords 28 may be connected with the upper portion of support arms 24 using hooks 29. Support cords 28 may be bungee cords, rope or other material that can connect support arms 24.

It is preferable to have support cords 28 removeably connected with support arms 24. Support cords 28 are preferably disconnected when plants 12 are being inserted into receptacle 22, to allow for easy insertion without risking breakage of stems 14. Once plants 12 are in place, support cords 28 are connected with external support arms 24 and stems 14 are draped over and supported by the support cords, as shown in FIG. 3.

It is apparent, however, that cords 28 may be non-flexible and may be permanently connected with support arms 24, and stems 14 may be manipulated into place in between cords 28 and the frame. However, the use of non-removable, and non-flexible cords makes it more likely that stems 14 will be damaged.

The frame is preferably shaped in the general three-dimensional shape that is desired for the woven plants. The frame may have a variety of three-dimensional shapes, including but not limited to a column, cone, hourglass, wavy, convex or concave shape.

To create an interlocking, woven plant with a three-dimensional column shape with a full crown, it is preferable to use a generally cone-shaped frame where the frame legs 42 define a narrower circumference at the bottom, rising up with a gradual expanding circumference until a medium circumference is defined at junction 45. Above junction 45, the circumference of frame legs 42 expands more rapidly to the top of the frame, and defines a wide circumference. The top of the frame may alternatively have a variety of other three-dimensional shapes, including a very wide circumference, or a wavy pattern.

The frame comprises a plurality of fairly rigid vertical frame legs 42 connected with a plurality of fairly rigid horizontal arms 44. The number and placement of the frame legs 42 and horizontal arms 44 may be adjusted, as desired. The frame preferably comes in two bilateral pieces, so that the frame may be split along a vertical, middle axis, creating two identical pieces, 40A and 40B, as shown in FIG. 1. The bilateral pieces 40A and 40B are connected with each other by connectors to create the frame. Connectors may be flexible metal tabs 47 which are folded over frame legs 42 to connect the bilateral pieces, or may be any other material or method known to connect vertical members. The use of a bilateral frame makes it easier to remove the frame once the woven plant is complete.

In other embodiments, the frame may come in multiple pieces where the top may separate from the bottom, or the frame may be separated into any number of pieces.

If the frame is in multiple pieces, the pieces are connected with tabs 47 prior to use, and the frame is received by the frame support. The frame and the frame support are placed in outer receptacle 22, and the desired number of plants are selected.

Stems 14 are separated so that they are not tangled or intertwined. Plant weaving begins once the plant stems 14 are positioned between external support arms 24, support cords 28, and the frame, as shown in FIG. 3.

Figure 5:
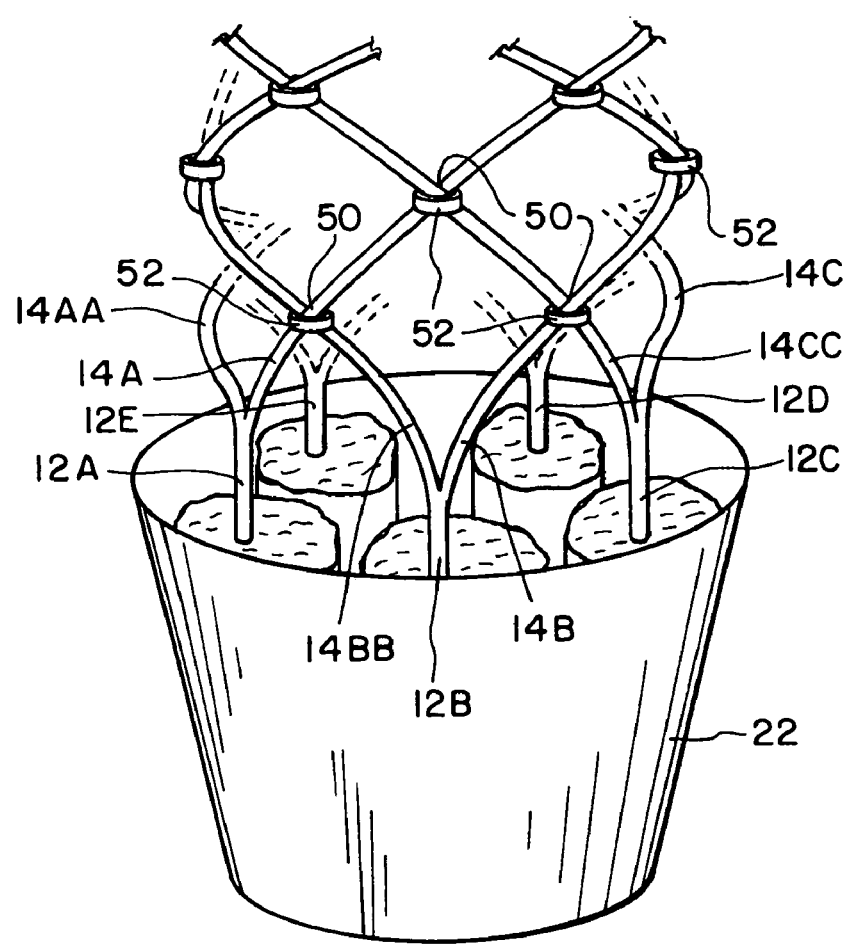
FIG. 5 is a perspective view of one weaving method, shown for clarity's sake without a frame.

The following description of the weaving method is illustrative only, and the number of plants and stems, as well as the weaving pattern, may vary. This illustrative example, as shown in FIG. 5, uses five plants. In each step, adjacent stems are crossed, forming an intersection.

A first plant 12A has two stems, stem 14A and 14AA, while a second, adjacent plant 12B has stems 14B and 14BB. Stems 14A and 14BB are adjacent to each other, as shown in FIG. 5.

Both stems from a single plant preferably are draped over a single support cord. In the illustrative example, stems 14A and 14AA are draped over and supported by a first support cord 28A between two support arms 24A and 24B. Stem 14A is grasped and moved in a first direction toward the adjacent stem 14BB. For illustrative purposes, stem 14A is moved to the right, and preferably may rest on a second support cord 28B, between support arms 24B and 24C.

The second plant 12B gives rise to stems 14B and 14BB, both of which preferably are resting on a single support cord 28B between two support arms 24B and 24C. Stem 14BB is moved in a second, opposite direction, toward adjacent stem 14A, for illustrative purposes to the left, creating the first cross or intersection 50 between stems 14A and 14BB in a first row. Intersection 50 results in one stem being outside the second stem. For illustration purposes, in this case, stem 14A is outside stem 14BB, as shown in FIG. 5.

Each intersection 50 is preferably secured with a tie 52. Periodically, as needed to support the stems, and to conform the stems to the three-dimensional frame shape, the stems are secured to the frame using ties 52.

The process is repeated with a third plant 12C, giving rise to stems 14C and 14CC, where stems 14B and 14CC are adjacent. Stem 14B is grasped and moved in the first direction toward adjacent stem 14CC, the right, and stem 14CC is grasped and moved to in the second, opposite direction toward adjacent stem 14B, creating a second cross or intersection 50 between stems 14B and 14CC in the first row. For the most symmetrical look, stem 14CC positioned similar to 14BB, so that 14CC is inside, or behind, stem 14B. However, the relative positions of the stems may be varied or kept the same, as desired.

In the illustrative example, the process is repeated with a fourth plant 12D, giving rise to stems 14D and 14DD, and adjacent to plant 12C. Stem 14C is moved in the first direction, and stem 14DD is moved in the second, opposite direction, creating another intersection in the first row. The process is repeated with a fifth plant 12E giving rise to stems 14E and 14EE, and where stem 14EE is adjacent to stem 14D, and stem 14D is moved in the first direction, and stem 14EE is moved in the second, opposite direction, forming another intersection 50 in the first row. Whether or not using five plants, all remaining stems are woven as described, wherein each stem is moved in a first or second direction and crossed one time with another stem, thereby creating a first row of plant intersections 50, as shown in FIG. 5. It is apparent that the number of plants 12 and stems 14 used in weaving will vary.

A second row of intersections is created in the same manner. The first stem is grasped and moved in the first direction toward another stem, the next, adjacent stem in that first direction. In the illustrative example, this other stem is stem 14CC, because stem 14CC is now adjacent to stem 14A after being woven in the first row. This other stem (stem 14CC) is moved in the opposition, second direction, forming an intersection 50 with the first stem in the second row. The intersections 50 of the second row are above, and in between the intersections 50 of the first row, as shown in FIG. 5.

In one embodiment, the weave pattern may be a double-weave wherein, each plant 12 gives rise to four stems 14 and, where one stem was used in the explanation set forth above, two stems are now used for each weaving step. The result of a double-weave is that there are four stems 14 at each intersection 50, with two stems behind and two stems in front.

In another embodiment, the weave pattern may be a combination-weave, wherein, for example, each plant 12 gives rise to three stems 14. In this illustrative embodiment, two stems 14 are moved to the right, and one stem 14 is moved to the left, creating intersection 50, with a total of three stems 14. It is apparent that repeating this pattern using multiple plants and weaving multiple intersections 50 will result in intersections 50 having a variety of number of total stems; some intersections 50 will have total of two stems, with one stem in front and one stem behind. Some intersections 50 will have a total of three stems 14, as described above. Some intersections 50 will have a total of four stems 14, with two stems in front and two stems behind. It is apparent that a variety of number and combination of stems may be woven.

The intersection 50 of the stems 14 may be manipulated so that each intersection 50 is at approximately the same vertical height, with an approximately consistent horizontal distance between each intersection 50 creating a weave with a consistent, interlocking pattern. That is, the intersections may be raised, lowered, or otherwise manipulated by hand during or after the weaving process to position the intersection in the desired location.

Intersections 50 are secured with ties 52. Ties 52 may be any flexible, removable material. As non-limiting examples, ties 52 may be rubber, silicone, string, or twist ties. Frame legs 42 and horizontal frame members 44 are preferably used as guides to assist in consistent, even and symmetrical location of each intersection 50. Ties 52 are periodically used to secure the stems to the frame, as needed to support the stems, or as needed to ensure that the stems conform to the three-dimensional shape of the frame. Ties 52 are preferably used to secure the stems to similar horizontal or vertical frame locations, to assure an even weaving pattern. Alternatively, ties 52 may be secured only to stems 14, without being connected with frame 40.

After completing the first row of weaving and securing stems 14 with ties 52, the weaving steps are substantially repeated to create a second row. The weave of the second row is done so that the intersections 50 of the second row are horizontally offset from intersections 50 of the first row, and are not directly above intersections 50 of the first row, as shown in FIG. 5. In addition, for the most symmetrical and classical woven pattern, a single stem alternates from being on the outside to being on the inside, as shown in FIGS. 4 and 5. This method of weaving creates a symmetrical, interlocking diamond pattern of plant stems. Because the stems are trimmed of leaves and branches, the beautiful diamond pattern is easily visible.

The steps are repeated as many times as needed to create the desired number of rows, or until most of length of the stems 14 are woven. It is often desirable to weave stems 14 up to the point where the leaves and branches were optionally left untrimmed.

The weaving may be as tight or as loose as desired by the operator, while taking care not to break stems 14. The weaving and location of crosses 50 may be adjusted during the weaving process, or after weaving the entire length of stems 14. Ties 52 may be adjusted or moved during or after weaving, and crosses 50 may be manipulated by hand during or after weaving.

Once the weaving is complete, support cords 28 are released and the entire woven plant and frame 40 are lifted out of outer receptacle 22. The woven plants may be shipped at this point.

Other embodiments of the invention involve using different shaped frames to create different shapes of diamond-patterned stems. For example, the frame may be oval or hourglass or any other shape. In another embodiment, objects may be placed inside the woven plant, for example a vase, may be used as a frame. After a period of time, ties 52 may be removed.

In yet another embodiment, the weaving device rests on a turntable or other rotatable flat surface 60, and the weaving device is rotated during weaving. In this embodiment, the operator can remain in essentially one position, while rotating the weaving device, for ease of weaving.

In yet another embodiment, internal frame is removed after a period of time, generally no less than one-year. As explained above, the use of bilateral frame pieces 40A and 40B may make it easier to remove frame. Connectors 47 are released, so that bilateral frame pieces 43 are no longer connected, and each frame piece 43 may be more easily removed. After removal of internal frame, the woven plant will retain its shape, even without frame.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A method of weaving plants into three-dimensional shapes comprising:
    (a) obtaining an outer receptacle including a frame support, and three-dimensional frame, and one or more plants with one or more stems therein, wherein said receptacle is connected with a plurality of support arms with an upper portion, wherein said upper portions of said support arms are connected to each other by a sufficient number of support cords,
    wherein each support cord is capable of supporting said stems and each support cord connects two of said support arms at said upper portion of each support arm at a height adequate to support said long stems during weaving,
    wherein said frame support is capable of receiving and supporting said three-dimensional frame, and wherein said frame support defines one or more plant-receiving spaces and connects with said outer receptacle,
    wherein said frame comprises a plurality of vertical frame legs and a plurality of horizontal frame arms forming a three-dimensional shape, and wherein said frame is capable of supporting stems tied to said frame during weaving and wherein said frame is capable of being received by said frame support;
    (b) selecting a plurality of plants wherein each plant has at least two stems and each stem has a similar length and thickness;
    (c) trimming said stems to remove leaves and branches along the length of each stem;
    (d) inserting said plants into said plant-receiving space of said plant-weaving device;
    (e) draping each stem over a support cord;
    (f) grasping a first stem that is draped over a first support cord and moving said first stem in a first direction toward a second stem that is adjacent to said first stem, and draping said first stem over a second support cord;
    (g) grasping the second stem that is draped over a second support cord and is adjacent to said first stem, and moving said second stem in a second, opposite direction toward said adjacent first stem, and draping said second stem over said first support cord, whereby said first stem and said second stem cross and form an intersection;
    (h) securing said intersection with a tie;
    (i) periodically securing said stems to said frame with a tie;
    (j) repeating steps (f) through (i) until all stems have been grasped and moved to form a first row of intersections;
    (k) grasping said first stem above said first row of intersections, moving said first stem in said first direction, and draping said first stem over a support cord;
    (l) grasping another, adjacent stem and moving said adjacent stem in a second, opposite direction so that said second stem is draped over a support cord, and wherein said first stem and the other stem overlap and form an intersection;
    (m) securing said intersection with a tie;
    (n) periodically securing said stems to said frame with a tie;
    (o) repeating steps (k) through (n) until all stems have been grasped and moved forming a second row of intersections thereby creating a woven three-dimensional shape;
    (p) continuing to grasp and move said stems as in steps (k) through (n) until said stem lengths are woven and secured to said frame;
    (q) removing said frame and plants woven into a three-dimensional shape from said outer receptacle.

2. The method of claim 1 wherein said woven three-dimensional frame is a column, and said woven three-dimensional shape is a column.

3. The method of claim 1 wherein said woven three-dimensional frame is an hourglass, and said woven three-dimensional shape is an hourglass.

4. The method of claim 1 wherein said woven three-dimensional frame is a cone, and said woven three-dimensional shape is a cone.

5. The method of claim 1 wherein said woven three-dimensional frame is convex, and said woven three-dimensional shape is convex.

6. The method of claim 1 wherein said woven three-dimensional frame is concave, and said woven three-dimensional shape is concave.

* * * * *